INVENTOR.
RALPH D. VAN EATON

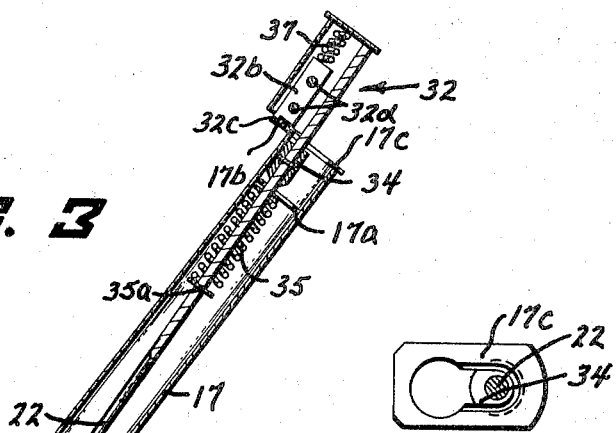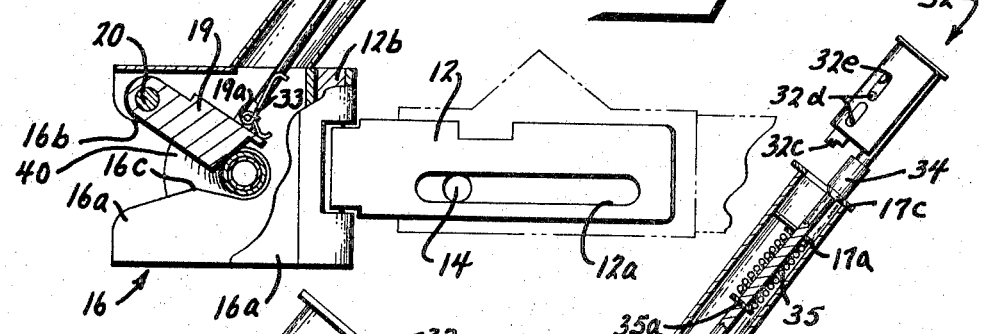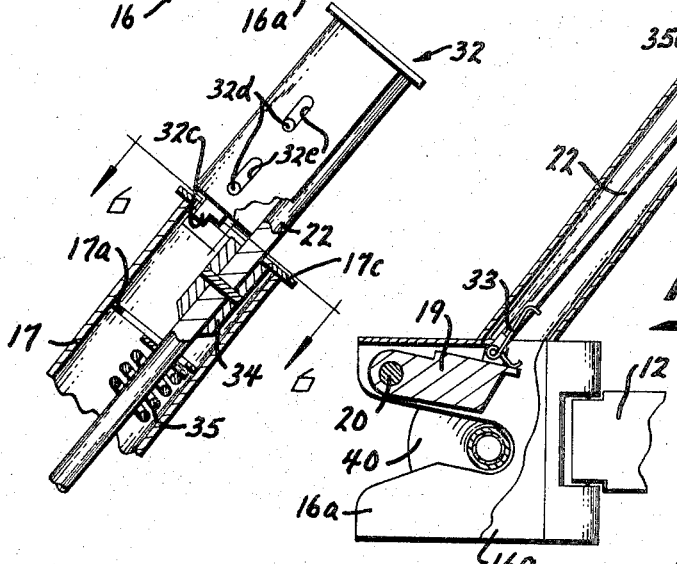

United States Patent Office 3,351,357
Patented Nov. 7, 1967

3,351,357
AGRICULTURAL IMPLEMENT COUPLER
Ralph D. Van Eaton, 2704 Rose Drive,
Vincennes, Ind. 47591
Filed Oct. 22, 1965, Ser. No. 501,015
10 Claims. (Cl. 280—415)

ABSTRACT OF THE DISCLOSURE

An agricultural implement coupler characterized by spaced-apart pivoting together receiving members on a tractor adapted to engage and positively secure, by snap action, adaptors mounted on an implement cross-bar, without the necessity of the operator leaving the tractor during the coupling or uncoupling of the implement.

The present invention relates to an agricultural implement coupler, and more particularly to a new and novel coupler structure which provides positive and ready coupling action not available in devices in use heretofore.

As is known, the coupling of an agricultural implement, such as, for example, a plow, cultivator, planter, or the like, to a conventional tractor has mostly been a tedious and time-consuming operation, oftentimes representing on the part of the tractor operator the necessity of making several "passes" to effect a coupling connection. While various approaches have been proposed to achieve quick and effective implement coupling, the prior arrangements largely failed because of high cost and undue component wear. Moreover, but depending upon particular tractor make, it has also been desirable to find an approach for tractor-implement coupling which does not necessitate the tractor operator leaving the tractor during either coupling or uncoupling.

By virtue of the instant invention, the applicant herein has provided a new and novel agricultural implement coupler which permits the ready and positive coupling of the implement and a tractor through virtually an automatic procedure. Broadly, the invention comprises two spaced-apart pivotal receiving members disposed on the tractor which are adapted to engage and secure, by snap action, adapters mounted on the implement cross-bar. Coupling is effected by moving the tractor bearing the coupler into engagement with the aforesaid adapters, and, thereafter, the mechanism further provides the important advantage of positively maintaining the desired locked or working position.

The instant coupler is readily adapted for use on any make of tractor, and, with most makes, is so designed that the operator does not have to leave his seat on the tractor during coupling or uncoupling of an implement. Actually, the aforedescribed snap action is accompanied by an audible indication of the coupling and, therefore, adds even a further desirable advantage for the tractor operator.

The applicant's new and novel agricultural implement coupler is represented by a minimum of components, which effectively cooperate to achieve positive coupling action. The unit is such that not only is its use readily and simply effected, but the components thereof lend themselves to ease in manufacturing and, hence, economy to the purchaser, in contrast to any prior type devices.

Accordingly, the principal object of the present invention is to provide a new and novel agricultural implement coupler.

Another object of the present invention is to provide a new and novel agricultural implement coupler which effects the desired coupling action through a snap-lock arrangement, and where such coupling is positively maintained during subsequent operation of the tractor.

A further and more general object of the present invention is to provide a new and novel agricultural implement coupler which is readily adapted to all makes of tractors; which permits the tractor driver to remain in position on the tractor during coupling and uncoupling, depending, of course, upon particular tractor make; which, through its snap action, provides an audible signal of coupling; which represents a minimum number of operating components; and, which is susceptible to ready assembly to the ultimate economy of the purchaser.

Other objects and a better understanding of the present invention will become more apparent from the following description, taken in conjunction with the accompanying drawings, wherein FIG. 1 is a top plan view of an agricultural implement coupler in accordance with the teachings of the instant invention;

FIG. 3 is a view in vertical section, partly fragmentary, showing the instant invention in its coupling position;

FIG. 4 is a view similar to that of FIG. 3, but showing the control rod of the coupler in its uncoupling position to permit the release of the carried agricultural implement;

FIG. 5 is a view similar to FIGS. 3 and 4, but showing one end of the control rod of the coupler in its locked or working position; and, FIG. 6 is a view in cross-section of further details of the latching assembly, representatively taken at line 6—6 of FIG. 5 and looking in the direction of the arrows.

Figure 1:
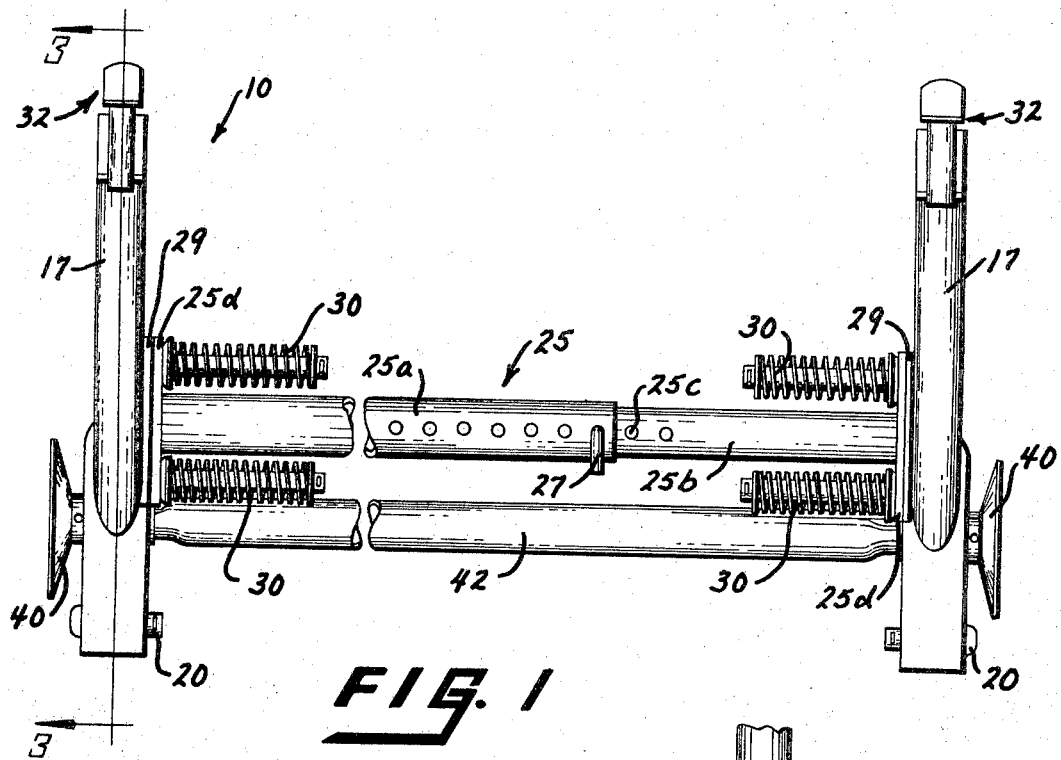

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the applicant's new and novel agricultural implement coupler 10 is adaptable for use in conjunction with the two lower points, or draft arms, of a conventional three-point hitch commonly found on present tractors after the usual ball and socket at each outer end is removed. In this regard, and particularly noting FIG. 3, one of the two lower points of such hitch is shown in phantom, where, representatively, mounting members 12 for the coupler are each received therewithin, a pin 14 in each lower point extending laterally through a slotted portion 12a in the mounting members 12, permitting positive mounting and carrying by the tractor.

Each of the mounting members 12 pivotally carries, at 12b, a receiving member 16, the latter being defined by spaced-apart side walls 16a and a mouth 16b having a raised central portion 16c at the bottom thereof, the latter configuration serving to even more positively achieve and retain the desired coupling relationship. Each of the receiving members 16 has an upwardly and forwardly extending tubular member 17 communicating with the space between the side walls 16a where a locking member 19, pivotal at 20, is disposed within such space. A control rod 22 pivotally connects the locking member 19 at 19a, and extends upwardly through the tubular member 17, the control assembly being described more particularly herebelow.

Figure 2:
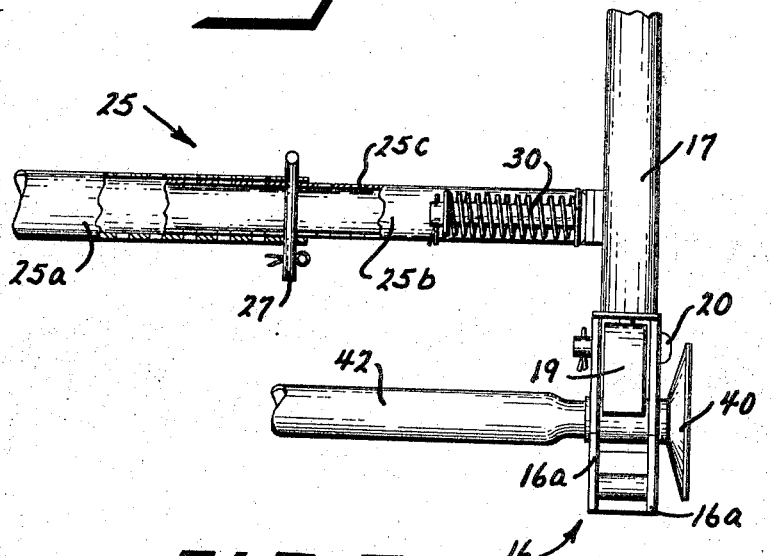
FIG. 2 is a view in elevation, partly fragmentary, looking from the bottom to the top of FIG. 1, showing, in particular, the cross-member assembly.

With reference now to FIGS. 1 and 2, a cross-member 25 is provided between the tubular members 17, serving to retain the receiving members 16 in a preselected spaced-apart relationship and permitting movement as a unit in their pivoting at 12b. In a preferred embodiment of the invention, the cross-member 25 comprises two telescopic sections 25a and 25b, where a series of alignable holes 25c are provided in each. A pin-cotter pin assembly 27 permits the ready establishment of the cross-member 25 to any desired width, depending upon the tractor design.

Plates 25d, disposed at each end of the cross-member 25, are removably mounted on a positioning assembly on each tubular member 17. In this latter connection, a plate 29 is secured to each tubular member 17, as by welding, for example, where each plate 29 further positions pairs of inwardly extending tension springs 30 on bolts extending therefrom. Such tension springs 30 are movable towards the plates 29, and with end plates 25d between the pairs of springs 30 and the plates 29, serve to urge and, hence, retain the end plates 25d of the cross-member 25 in position during use.

With reference now to FIGS. 3, 4 and 5, the control assembly for the instant coupler includes the aforesaid control rod 22 which has a latching assembly 32 secured to its free end, as by roll pins (not shown) or welding, for example. A wire spring 33 is fastened around the pivot 19a, and is arranged to cause the continual urging of the control rod 22 towards the inner surface of the tubular member 17 shown at the left in FIGS. 3, 4 and 5. A bushing 34, or like enlargement, integral or otherwise, is disposed on the control rod 22 near the latching assembly 32, for reasons which will become apparent herebelow. A spring unit 35, positioned around the control rod 22 and seated between a retainer 35a and a projection 17a within the tubular member 17, urges the control rod 22 against an unhooking or unlatching position, to be discussed more fully herebelow.

With further reference now to the latching assembly 32, a latching element 32b, having a projecting portion 32c, selectively cooperates with an edge surface 17b of an end member 17c of the tubular member 17. The latching element 32b is urged into a latching position by a spring 37, where pins 32d extend from the sides of the latching element 32b and slide within elongated slots 32e in the walls of the latching assembly 32, one pair of such pins 32d serving as a means for hand controlling the slidable movement of the latching element 32b. As will be understood, the latching assembly 32 is grasped for controlling movement of the control rod 22, where the end member 17c of the tubular member 17 has a key-hole-like opened configuration in plan (see FIG. 6) so that the bushing 34 can be selectively seated beneath or on the restricted portion thereof, also to be further described herebelow.

In use, the instant coupler is secured to any make of tractor, as, by example, through the mounting members 12. Thereafter, the cross-member 25 is positioned, by means of plates 25d, between the respective pairs of tension springs 30 and the plates 29, where, of course, the cross-member 25 is telescopically positioned, and secured by pin-cotter pin assembly 27, depending upon particular tractor make involved.

As stated, any desired implement may be coupled to the tractor, and, in this connection, adapters 40 are secured to the free ends of a cross-bar 42 of the implement. At this time, the control assembly, including the latching assembly 32, the control rod 22 and the locking member 19 are in the position of FIG. 3. The tractor operator moves the tractor rearwardly, until each of the adapters 40 are urged into the mouth 16b of the receiving member 16, passing over the raised central portion 16c thereof and into a seating position.

When seating is accomplished, the locking member 19 moves downwardly, causing an audible signal upon contact with each adapter 40, the latter being achieved by reason of the spring unit 35. In any event, the wire spring 33 causes the control rod 22 to continually be urged towards the position of FIG. 3, where the projecting portion 32c of the latching element 32b may then be disposed in the FIG. 3 position, i.e. with the projecting portion 32c in cooperative engagement with the edge surface 17b of the end member 17c of the tubular member 17.

Considering FIGS. 5 and 6, in order to place the mechanism in a locked or working position, viz. a position which positively precludes any miss-movement during use, the latching assembly 32 is moved so that the bushing 34 is disposed beneath the restricted portion of the end member 17c of the tubular member 17. At this time, in one form of the invention, the projecting portion 32c of the latching element 32b also extends downwardly into the aforesaid key-hole opening in the end member 17c. During this operation, the locking member 19 generally retains the same position as shown in FIG. 3. As noted hereabove, one of the pairs of pins 32d is used to move the latching element 32b, and, hence, the projecting portion 32c, out of the position of FIG. 3, and, when released, into the position of FIG. 5.

When it is desired to release the implement, and in the instance where the tractor design so permits, the tractor operator merely turns in his seat and grasps each of the latching assemblies 32, moving same so that the bushing 34 moves through the larger portion of the key-hole-like opening in the end member 17c of the tubular member 17 and into retained relationship on the restricted area thereof (see FIG. 4). The preceding action results in the movement of the locking member 19 to permit free passage of each of the adapters 40 from the mouth 16b of each receiving member 16. It should be understood that movement of the mechanism to such unhooking or unlatching position is against the strength of each of the spring units 35 in the respective tubular members 17.

From the preceding, it should be apparent that the applicant herein has provided a new and novel tractor or like vehicle mounted coupler for an implement which, through snap action, achieves hook-up or latching of the implement to the tractor, and, additionally, provides a positive coupled relationship in a locked or working position. On the other hand, with the structure at hand, the implement may be quickly and readily disengaged from the tractor through minimum effort on the part of the tractor operator. The invention is flexible in use, in that, for example, the cross-member 25 may be removed, after coupling, in the instances where the upper point of the conventional three-point tractor hitch must be utilized and such cross-member 25 is in the way. Obviously, with the use of the cross-member 25 to retain the receiving members 16 in a fixed spaced-apart relationship, even when such receiving members pivot, i.e. as a unit, coupling is readily effected without the necessity of making a series of consecutive "passes" as has been the past practice. In other words, coupling is positively achieved with a minimum of effort on the part of the tractor operator, even though the tractor is not in alignment with the implement being coupled.

The applicant's new and novel coupler is, of course, susceptible to various changes within the spirit of the invention. For example, proportioning may be varied, different forms of latching provided, and other mounting relationships employed for the connecting member and between the coupler and the particular tractor make. Thus, the above description should be considered illustrative and not as limiting the scope of the following claims.

I claim:

1. A coupler mechanism for use between a vehicle and an implement comprising means for mounting said coupler mechanism on said vehicle, receiving members pivotal laterally on said mounting means each having a mouth with a pivotal locking member, adjustable means retaining said receiving members in a preselected spaced-apart relationship, each of said receiving members adapted to receive a member forming part of said implement, a control assembly for said pivotal locking member, and means forming part of each control assembly selectively maintaining said pivotal locking member in latching and unlatching relationships with said member forming part of said implement.

2. A coupler mechanism for use between a vehicle and an implement comprising means for mounting said coupler mechanism on said vehicle, receiving members pivotally disposed on said mounting means for lateral movement and each having a mouth for selectively receiving a member forming part of said implement, a length adjustable cross-member maintaining said receiving members in a preselected spaced-apart relationship, a pivotal locking member disposed within each mouth of said receiving members, and a control assembly for each pivotal locking member comprising a control rod connecting said pivotal locking member, means urging said control rod and said pivotal locking member into a latching relationship between said pivotal locking member and said member forming a part of said implement, and latching means on said control rod selectively maintaining the position of said pivotal locking member with respect to said member forming a part of said implement.

3. A coupler mechanism for use between a vehicle and an implement comprising means for mounting said coupler mechanism on said vehicle, receiving members pivotally disposed on said mounting means and each having a mouth for selectively receiving a member forming part of said implement, a removable connecting member maintaining said receiving members in a preselected spaced-apart relationship, a locking member pivotally disposed within each mouth of said receiving members, and a control assembly for each locking member comprising a tubular member communicating with said mouth of said receiving member, a control rod extending within said tubular member connecting said locking member, and a latching assembly and an enlargement on said control rod cooperable with portions of said tubular member selectively maintaining the position of said pivotal locking member with respect to said member forming part of said implement in latching, unlatching and locking relationships.

4. The coupler mechanism of claim 3 where spring means urge said control rod and said pivotal locking member into a latching relationship between said pivotal locking member and said member forming part of said implement.

5. A coupler mechanism for use between a vehicle and an implement comprising means for mounting said coupler mechanism on said vehicle, receiving members pivotally disposed on said mounting means each having a mouth with a pivotal locking member, each of said receiving members adapted to receive a member forming part of said implement, an interconnecting member serving to maintain said receiving members in a preselected spaced-apart relationship, a control assembly for each of said pivotal locking members, and means forming part of each control assembly selectively maintaining said pivotal locking member in latching and unlatching relationships with said member forming part of said implement.

6. A coupler mechanism for use between a vehicle and an implement comprising means for mounting said coupler mechanism on said vehicle, receiving members disposed on said mounting means each having a mouth with a pivotal locking member, a control rod connecting each pivotal locking member, each of said receiving members adapted to receive a member forming part of said implement, a control assembly for each of said pivotal locking members, and a latching assembly and an enlargement on said control rod forming part of each control assembly selectively maintaining said pivotal locking member in latching and unlatching relationships with said member forming part of said implement.

7. A coupler mechanism for use between a vehicle and an implement comprising means for mounting said coupler mechanism on said vehicle, receiving members pivotally disposed on said mounting means and each having a mouth for selectively receiving a member forming part of said implement, a pivotal locking member disposed within each mouth of said receiving members, a control assembly for each pivotal locking member comprising a control rod connecting said pivotal locking member and a latching member, means urging said control rod and said pivotal locking member into a latching relationship between said pivotal locking member and said member forming part of said implement, and a latching assembly and an enlargement on said control rod selectively cooperable with said latching member maintaining the position of said pivotal locking member with respect to said member forming part of said implement.

8. The coupler mechanism of claim 7 where said latching member has an opening with a restricted portion, and where said enlargement on said control rod cooperates with said restricted portion in bearing and seating relationships.

9. A hitch mechanism for use between a vehicle having lower draft arms and an implement comprising means mounting said hitch mechanism at the outer ends of said lower draft arms on said vehicle, receiving members pivotal laterally on said mounting means, means retaining said receiving members in a preselected spaced-apart relationship, said receiving members each positioning a pivotal locking member, and a control assembly achieving a locking relationship between said pivotal locking member and said implement.

10. The hitch mechanism of claim 9 where said retaining means is adjustable.

References Cited

UNITED STATES PATENTS

| | | | |
|---|---|---|---|
| 2,912,257 | 1/1959 | Du Shane | 280—460 |
| 2,935,145 | 6/1960 | Du Shane et al. | 172—275 |
| 3,065,977 | 11/1962 | Virtue et al. | 280—460 |
| 3,116,075 | 12/1963 | Hershman et al. | 280—479 |
| 3,220,751 | 11/1965 | Tweedale | 280—461 |
| 3,312,478 | 4/1967 | Knaapi | 280—405 |

LEO FRIAGLIA, *Primary Examiner.*